(12) United States Patent
Narayanan et al.

(10) Patent No.: US 11,470,046 B2
(45) Date of Patent: Oct. 11, 2022

(54) MULTI-LEVEL DATA CHANNEL AND INSPECTION ARCHITECTURE INCLUDING SECURITY-LEVEL-BASED FILTERS FOR DIVERTING NETWORK TRAFFIC

(71) Applicant: Bank of America Corporation, Charlotte, NC (US)

(72) Inventors: Rajesh Narayanan, Chennai (IN); Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 716 days.

(21) Appl. No.: 16/550,517

(22) Filed: Aug. 26, 2019

(65) Prior Publication Data
US 2021/0067491 A1    Mar. 4, 2021

(51) Int. Cl.
*H04L 29/06* (2006.01)
*H04L 9/40* (2022.01)
*H04L 12/46* (2006.01)
*H04L 69/324* (2022.01)

(52) U.S. Cl.
CPC ...... *H04L 63/0245* (2013.01); *H04L 12/4633* (2013.01); *H04L 63/0457* (2013.01); *H04L 63/1416* (2013.01); *H04L 69/324* (2013.01); H04L 2463/041 (2013.01)

(58) Field of Classification Search
CPC ............. H04L 63/0245; H04L 63/0457; H04L 63/1416; H04L 69/324
See application file for complete search history.

(56) References Cited

U.S. PATENT DOCUMENTS

| | | |
|---|---|---|
| 6,542,930 B1 | 4/2003 | Auvenshine |
| 7,010,538 B1 | 3/2006 | Black |
| 8,185,547 B1 | 5/2012 | Ordonez |
| 8,683,592 B1 | 3/2014 | Dotan et al. |
| 8,768,880 B2 | 7/2014 | Erla et al. |
| 8,775,685 B1 | 7/2014 | Brebner |
| 8,782,434 B1 | 7/2014 | Ghose |
| 9,536,201 B2 | 1/2017 | Reshef et al. |
| 9,563,411 B2 | 2/2017 | Roberts |
| 9,589,051 B2 | 3/2017 | Bergstrom et al. |
| 9,594,912 B1 | 3/2017 | Thioux et al. |
| 9,785,535 B2 | 10/2017 | Kaulgud et al. |

(Continued)

*Primary Examiner* — Jeffrey C Pwu
*Assistant Examiner* — Thong P Truong
(74) *Attorney, Agent, or Firm* — Weiss & Arons LLP

(57) ABSTRACT

Deep packet inspection of data in a multi-spoke data tunnel inspection architecture is provided. Inspection may include using a data review tunnel module to receive a first portion of a data stream, encrypted with a first encryption scheme, in a first data conduit. The method may also include receiving a second portion of the data stream, encrypted with a second encryption scheme, in the second data conduit. The method may also include decrypting and reconstructing a complete data stream. The complete data stream may be derived from the decrypted and reconstructed first data stream and the decrypted and reconstructed second data stream. The method may then analyze and review the flow of the complete data stream to determine whether the flow of the data stream is associated with a pre-determined likelihood of intrusion, and then prepare a data report based on the analysis and review.

19 Claims, 13 Drawing Sheets

(56) References Cited

U.S. PATENT DOCUMENTS

| | | |
|---|---|---|
| 9,825,953 B2 | 11/2017 | Gibbons |
| 9,892,020 B1 | 2/2018 | Ophir et al. |
| 9,910,894 B2 | 3/2018 | Hays et al. |
| 10,148,675 B1 | 12/2018 | Brandwine et al. |
| 10,162,628 B2 | 12/2018 | Golding et al. |
| 10,218,808 B2 | 2/2019 | Milton et al. |
| 10,318,566 B2 | 6/2019 | Clark et al. |
| 2003/0067876 A1 | 4/2003 | Sharma et al. |
| 2003/0236995 A1 | 12/2003 | Fretwell, Jr. |
| 2004/0042470 A1 | 3/2004 | Cooper et al. |
| 2005/0254490 A1 | 11/2005 | Gallatin et al. |
| 2006/0184527 A1 | 8/2006 | Chi et al. |
| 2006/0271823 A1 | 11/2006 | Smith |
| 2007/0127793 A1 | 6/2007 | Beckett et al. |
| 2008/0016502 A1 | 1/2008 | Henderson et al. |
| 2008/0158339 A1 | 7/2008 | Civanlar et al. |
| 2008/0168332 A1 | 7/2008 | Palanki et al. |
| 2009/0287628 A1 | 11/2009 | Indeck et al. |
| 2009/0319334 A1 | 12/2009 | Dhananjaya et al. |
| 2010/0142539 A1 | 6/2010 | Gooch et al. |
| 2010/0145720 A1 | 6/2010 | Reiner |
| 2010/0161492 A1 | 6/2010 | Harvey et al. |
| 2010/0318619 A1 | 12/2010 | Meijer |
| 2011/0145828 A1 | 6/2011 | Takahashi et al. |
| 2011/0276789 A1 | 11/2011 | Chambers et al. |
| 2012/0084838 A1 | 4/2012 | Inforzato et al. |
| 2012/0167103 A1 | 6/2012 | Kim et al. |
| 2013/0086096 A1 | 4/2013 | Indeck et al. |
| 2013/0151979 A1 | 6/2013 | Snider et al. |
| 2013/0159239 A1 | 6/2013 | Brown et al. |
| 2013/0290450 A1 | 10/2013 | Butler et al. |
| 2014/0089023 A1 | 3/2014 | Zhu |
| 2014/0114909 A1 | 4/2014 | Schuster et al. |
| 2014/0114929 A1 | 4/2014 | Henrichs et al. |
| 2014/0281385 A1 | 9/2014 | Tu |
| 2014/0317681 A1 | 10/2014 | Shende |
| 2014/0324570 A1 | 10/2014 | Lawrence |
| 2014/0358869 A1 | 12/2014 | Kim |
| 2014/0359605 A1* | 12/2014 | Leet ................... G06F 21/10 717/174 |
| 2015/0143077 A1 | 5/2015 | Khan |
| 2015/0161214 A1 | 6/2015 | Kali et al. |
| 2015/0200967 A1 | 7/2015 | Redlich et al. |
| 2015/0213444 A1 | 7/2015 | McEntee et al. |
| 2015/0302070 A1 | 10/2015 | Gross et al. |
| 2015/0332297 A1 | 11/2015 | Perez et al. |
| 2016/0019776 A1 | 1/2016 | Advani |
| 2016/0021181 A1 | 1/2016 | Ianakiev et al. |
| 2016/0062747 A1 | 3/2016 | Stanfill et al. |
| 2016/0259834 A1 | 9/2016 | Bishop |
| 2016/0275303 A1 | 9/2016 | Narayanaswamy et al. |
| 2016/0283715 A1 | 9/2016 | Duke et al. |
| 2016/0301957 A1 | 10/2016 | McCarthy et al. |
| 2016/0306862 A1 | 10/2016 | Sitsky et al. |
| 2016/0323301 A1 | 11/2016 | Boss et al. |
| 2016/0330068 A1 | 11/2016 | Beisiegel et al. |
| 2017/0031599 A1 | 2/2017 | Bowman et al. |
| 2017/0041317 A1 | 2/2017 | Kurian et al. |
| 2017/0041322 A1 | 2/2017 | Kurian et al. |
| 2017/0098002 A1 | 4/2017 | Byrnes et al. |
| 2017/0155698 A1 | 6/2017 | Berg et al. |
| 2017/0177263 A1 | 6/2017 | Das et al. |
| 2017/0178100 A1 | 6/2017 | Bergeon et al. |
| 2017/0193240 A1 | 7/2017 | Baker et al. |
| 2017/0214701 A1 | 7/2017 | Hasan |
| 2017/0264619 A1 | 9/2017 | Narayanaswamy et al. |
| 2018/0013583 A1 | 1/2018 | Rubenstein et al. |
| 2018/0013608 A1 | 1/2018 | Vierimaa |
| 2018/0048520 A1 | 2/2018 | Nair et al. |
| 2018/0048693 A1 | 2/2018 | Gulbinas et al. |
| 2018/0124085 A1* | 5/2018 | Frayman ............... G06N 20/20 |
| 2018/0152496 A1 | 5/2018 | Wilson et al. |
| 2018/0205552 A1 | 7/2018 | Struttmann et al. |
| 2018/0284737 A1 | 10/2018 | Cella et al. |
| 2018/0329644 A1 | 11/2018 | Das et al. |
| 2018/0365106 A1 | 12/2018 | Huang et al. |
| 2019/0012316 A1 | 1/2019 | Bahrie et al. |
| 2019/0034660 A1 | 1/2019 | Ford et al. |
| 2019/0066111 A1 | 2/2019 | Bizarro et al. |
| 2019/0080022 A1 | 3/2019 | Matsuo |
| 2019/0089748 A1 | 3/2019 | Manor et al. |
| 2019/0121978 A1 | 4/2019 | Kraemer et al. |
| 2019/0138524 A1 | 5/2019 | Singh et al. |
| 2019/0146998 A1 | 5/2019 | Jin et al. |
| 2019/0155758 A1 | 5/2019 | Walker |
| 2019/0156429 A1 | 5/2019 | Beckmann et al. |
| 2019/0243836 A1 | 8/2019 | Nanda et al. |
| 2019/0251457 A1 | 8/2019 | Byrnes et al. |
| 2019/0260623 A1 | 8/2019 | Li et al. |
| 2019/0289102 A1 | 9/2019 | Goel et al. |
| 2019/0297109 A1 | 9/2019 | Guo et al. |
| 2019/0306034 A1 | 10/2019 | Shanbhag et al. |
| 2019/0317944 A1 | 10/2019 | Deremigio et al. |
| 2019/0319987 A1 | 10/2019 | Levy et al. |
| 2019/0333140 A1 | 10/2019 | Sullivan et al. |
| 2019/0347235 A1 | 11/2019 | Kuehm et al. |
| 2019/0362452 A1 | 11/2019 | Brunets et al. |
| 2020/0005312 A1 | 1/2020 | Bull |
| 2020/0202008 A1 | 6/2020 | Pfleger de Aguiar et al. |
| 2020/0202429 A1 | 6/2020 | Cella |
| 2020/0287996 A1 | 9/2020 | Vann et al. |
| 2020/0403905 A1 | 12/2020 | Allen et al. |
| 2021/0064780 A1 | 3/2021 | Riedel et al. |

\* cited by examiner

MULTI-LEVEL DATA CHANNEL AND INSPECTION ARCHITECTURE INCLUDING SECURITY-LEVEL-BASED FILTERS FOR DIVERTING NETWORK TRAFFIC

FIELD OF TECHNOLOGY

Aspects of the disclosure relate to data architectures. Specifically, aspects of the disclosure relate to architectures for use in verifying and authenticating data in data streams.

BACKGROUND OF THE DISCLOSURE

Digital packet inspection (sometimes referred to as deep packet inspection) ("DPI") inspects in detail the data being sent over a computer network. At times, DPI can take actions, with respect to the data, such as blocking, re-routing, or logging the data. DPI is often used to ensure that the data is, inter alfa, in correct format, to check for malicious code, eavesdropping and for internet censorship.

Many DPI methods, however, are slow and bandwidth-consumptive. This limits their effectiveness—especially for use with high-bandwidth applications. It would be desirable to develop more efficient methods of DPI.

While special routers are being developed to perform DPI, it would also be desirable to develop architectures that are directed to increasing speed and performance of DPI. It would be yet further desirable to increase speed and performance of DPI, yet, at the same time reduce the bandwidth consumption by DPI.

SUMMARY OF THE DISCLOSURE

A multi-spoke data inspection tunnel architecture is provided. The multi-spoke data tunnel inspection architecture includes a data tunnel. The data tunnel is preferably in electronic communication with a complementary pair of a first data conduit and a second data conduit. The data tunnel includes a data review tunnel module and a data collector module. The data collector module is preferably in electronic communication with the data review tunnel module. The data tunnel further includes an interpreter module. The interpreter module is preferably in electronic communication with the data review tunnel module. The data tunnel also includes a data review decision rules module. The data review decision rules module is preferably in electronic communication with the data review tunnel module. The data tunnel also includes a data reporter module. The data reporter module in electronic communication with the data review tunnel module. The data review tunnel module is configured to receive a first portion of a data stream in the first data conduit. The first portion of the data stream is preferably encrypted with a first encryption scheme. The data review tunnel module is preferably also configured to receive a second portion of the data stream in the second data conduit. The second portion of the data stream is preferably encrypted with a second encryption scheme. The data review tunnel module is also configured to decrypt and reconstruct a complete data stream. The complete data stream may preferably be reconstructed from the first data stream and the second data stream.

The data review tunnel module may also be configured analyze and review the flow of the data stream in conjunction with the data collector module, the interpreter module, and the data review decision rules module. The analyzing and reviewing preferably for determines whether the flow of the data stream is associated with a higher than threshold level of likelihood of intrusion by an intruder. The data review tunnel module may also be configured to prepare, using the data reporter module, a data report based on the analysis and review, and use the data reporter module to publish the data report.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
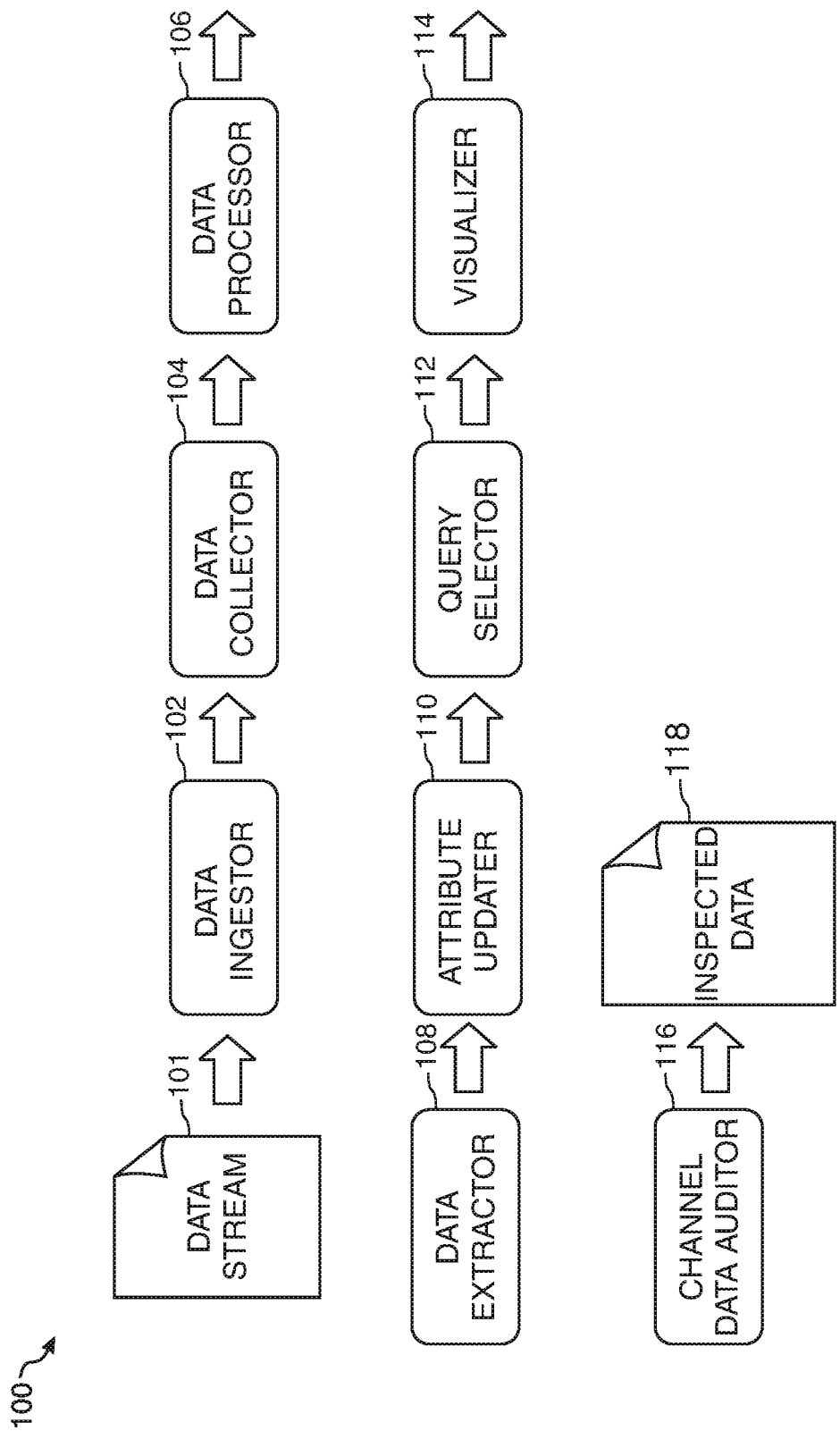
FIG. 1 shows an illustrative architecture include mechanisms within a data analysis and review conduit in accordance with principles of the disclosure.

Aspects of the disclosure relate to architectures and methods associated therewith according to certain embodiments. Preferably present structures for intercepting the data and/or hiding/altering the contents of the data. The architectures set forth herein enables intercepting the data and/or hiding/altering the contents of the data because the analysis and review of the data is preferably performed by the architectures either prior to loading of the data into the greater system and/or at certain selected, preferably predetermined, points of the data channel.

Theoretically, the architectures of the current embodiments can preferably be conceived of as a horizontal review system. Such a review system may preferably be configured to process data streams, data objects, and/or data sets (collectively referred to herein as, the "data"). Each of the above preferably have multiple parts, varying content and different data types. Accordingly, the architectures fill a need to create a tiered inspection layer that allows data to be inspected, not just as a packet level but in varying gradations—i.e., varying levels of inspection. Creating this multi-level data "filter" architecture preferably enables the data to be searched in various gradations of searching. In addition, such an architecture passes the data through different quality assurance parameters. Checking the data with respect to such parameters informs analysis and review ("A&R") of the data along with certifying the data vis-à-vis other functional workflows.

The embodiments of the architecture disclosed herein involve comprehensive A&R channeling across one or more digital pipes.

A basic channel may include the following—

Data Packets (DP1, DP2, . . . DPn)–x.

Each of data pipes (L1, L2, . . . Ln) may include complementing pairs. The Data pipes can be segmented into levels each having specific/varying data attribute/metadata extracting capability. For the purposes of the disclosure herein, L1, a first data pipe, should be considered a basic data audit trail. Each new layer—i.e., L2 to Ln—may preferably add a new set of policies and requirements.

Relatively large amounts of real-time, or streaming, data requires one or more data processing pipelines. Each pipeline preferably contains paired pipe layers, the advantages of which will be described below in more detail.

A multi-spoke data inspection tunnel architecture is provided. The architecture may include a data tunnel. The data tunnel may include a data review tunnel module. The data review tunnel module may include a data collector module. The data collector module is preferably in electronic communication with the data review tunnel module in a hub and spoke relationship. The data review tunnel module preferably represents the hub and the data collector module preferably represents a spoke. In the hub and spoke model, interspoke electronic communication—i.e., communication between the various spokes—typically, though not always, proceeds via the hub—e.g., the data review tunnel module.

The data tunnel may also include an interpreter module. The interpreter module is preferably in electronic communication with the data review tunnel module in a hub and spoke relationship where the data review tunnel module preferably represents the hub and the interpreter module represents a spoke additional to the data collector module.

The data tunnel may also include a data review decision rules module. The data review decision rules module is preferably in electronic communication with the data review tunnel module in a hub and spoke relationship where the data review tunnel module preferably represents the hub and the interpreter module represents yet another spoke additional to the data collector module and the interpreter module.

The data tunnel may also include a data reporter module. The data reporter module may preferably be in electronic communication with the data review tunnel module in a hub and spoke relationship where the data review tunnel module preferably represents the hub and the interpreter module represents yet another spoke additional to the data collector module, the interpreter module and data review decision rules module.

In some embodiments, the data review tunnel module may be configured to receive a data stream. The data review tunnel module may be configured to analyze and review the data stream in conjunction with the data collector module, the interpreter module, and the data review decision rules module.

In certain embodiments, the data review tunnel may validate data in the data stream preferably only if the data review tunnel module receives a validation of the data in the data stream from the data collector module, the interpreter module, and the data review decision rules module.

In some embodiments, the data collector module may be configured to coordinate transportation of data from ingestion at data receipt, and throughout the rest of the multi-spoke data inspection tunnel architecture. The data review tunnel module may be configured to instruct the data reporter module to publish a data report based on the analysis and review of the data stream.

In certain embodiments, the interpreter module may be configured to review data received by the data review tunnel module and to establish a type of data for reference by the data review tunnel module.

The data review decision rules module may be configured to store rules for reviewing and analyzing the data. Such rules may also govern the alteration, correction or other adjustment of reviewed data in the system.

The data reporter module may be configured to prepare a report based on the analysis and review conducted by the data review tunnel module in conjunction with the data review decision rules module, the data interpreter module and the data collector module.

In some embodiments, the data reporter module may only be configured to prepare a report in response to the validation of the data stream, or some part of the data stream, by the data review tunnel module.

A multi-level data channel and inspection architecture is disclosed. The multi-level data pipeline may receive a data stream at an upstream portion of the tunnel and output inspected data at a downstream portion of the pipeline.

The pipeline may include a plurality of pipes. The plurality of pipes may include one or more complementary pairs of pipes. Each pipe within a complementary pair of pipes may be encrypted using a different security key from the security key used to encrypt a second pipe of the same complementary pair of pipes. Encryption of the data stream as it passes through the two pipes in each of the complementary pair of pipes may preferably form a two-key encryption scheme.

The pipeline may also include a data manager configured to coordinate passage of the data into and out of the pipeline. Each of the complementary pairs of pipes is configured to inspect the data on a different level of data channel inspection than any of the other of the complementary pair of pipes, each level of data channel inspection having individual data attribute and/or metadata extracting capabilities.

Each of the complementary pairs of pipes may preferably be coupled in parallel to one another within the multi-level data pipeline. As such, the inputs of each of the complementary pairs may preferably receive, in parallel, some or all of the data from an upstream data stream—inspect the data—and then output the data as inspected data.

In certain embodiments, each complementary pair of pipes may be configured to review and analyze a flow of data through the complementary pair of pipes. The review and analysis of the flow may be directed to, and/or based on, flow characteristics of the data stream.

As described above, each pipe (or both pipes taken together) of the complementary pair of pipes may be configured to carry, and analyze, a partial amount (or even all of) the data stream.

Each complementary pair of pipes is in electronic communication with a second complementary pair of data pipes, the second complementary pair of data pipes operable to review and analyze data at a different security level from the first complementary pair of data pipes. In some embodiments, the first complementary pair of pipes may be in parallel electronic communication with the second complementary pair of pipes. In other embodiments, the first complementary pair of pipes may be in serial electronic communication with the second complementary pair of pipes.

In some embodiments, a first of the plurality of pipes may be configured to transfer only data packets having a first data packet size. The first data packet size may be a size that is equal to or greater than a first threshold size. In such embodiments, a second of the plurality of pipes may be configured to transfer only data packets that have less than the first data packet size. In certain embodiments, the second data pipe may be configured to transfer data packets that have greater than or equal to a second threshold size.

Some embodiments may include a plurality of pipes which may be configured to transfer data packets at greater than or equal to a threshold data transfer rate.

Each of the plurality of pipes may be configured to transfer data packets at less than or equal to a threshold data transfer rate. It should be noted that in such an embodiment, the data packets may have been diverted from a main data stream. The data packets may have been diverted from the main data stream at least because the data packets have been selected for inspection and analysis. The transfer rate of the diverted data packets may need to be slowed for inspection and analysis. Accordingly, the data packets, when travelling in the main data stream, may be flowing at a first data transfer rate. The same data packets, when travelling in the diverted data stream, may be slowed to no greater than a second data transfer rate—where the second data transfer rate is slower than the first data transfer rate.

In certain embodiments, each of the plurality of pipes may be configured to transfer data packets at a data transfer rate that is different from the data transfer rate of the remainder of the plurality of pipes. In some embodiments, each of the plurality of pipes may be configured to transfer data packets at a data transfer rate that is different from the data transfer rate of some of the remainder of the plurality of pipes but the same as, or similar to, the data transfer rate of another portion of the remainder of the plurality of pipes.

In certain embodiments, the plurality of pipes may be configured to transfer data packets a level of data security that is different from the level of data security of the remainder of the plurality of pipes.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Conventional data inspections are "vertical" in nature—i.e., data is reviewed and analyzed in such inspections, but no mechanism for intercepting and hiding/altering the data is provided. The following embodiments provide modules and mechanisms for intercepting data and providing necessary review mechanisms for data removal, adjustment and alteration.

FIG. 1 shows a group of possible audit mechanisms for use along a data pipe 100. Data pipe 100, also referred to herein as one type of a data tunnel review architecture. This group of possible audit mechanism may include data ingestor 102, data collector 104, etc. Each of these mechanisms may be used alone or in some combination with one another. It should be noted that the channel data manager (not shown in FIG. 1) may coordinate passage of the data into, between and out of one or more of the mechanisms.

Data ingestor 102 may serve to bring the data stream 101 into the pipeline. As such, data ingestor 102 preferably is on the externally-facing input side of the data pipeline. It should be noted that each individual pipe in which some or all of mechanisms 101-118 are arranged preferably have different set of requirements regarding data integrity and verity that can be implemented as part of an initial application. These sets of requirements may also support real-time adjustment of data based on real/perceived threats and/or errors in the data.

It should be noted that each of multiple pipes may be arranged with various audit levels. The data manager may force or bypass one or more of input 101, output 118 and mechanisms 102-116, or certain levels within mechanisms 102-116, based on initial and/or subsequent reviews. Such forcing or bypassing may be dependent, in certain embodiments, upon the data attributes/metadata-extracting capability of the individual pipes.

Data collector 104 may preferably coordinates transportation of data from ingestion layer to, and, at times, throughout, the rest of data pipeline.

Data processor 106 preferably processes the collected data from the previous layer. Data processor 106 may serve to route the data to a different destination—the different destination being one that is either in or out of the pipe—and/or classify the data flow. It should be noted that architectures, according to the embodiments, can preferably identify packet flows, rather than conducting a packet-by-packet analysis. This enables institution of control actions based on accumulated flow information. More specifically, many devices can identify packet flows thereby allowing control actions based on accumulated flow information. Such packet flow analysis may include identifying various aspects of the flows and likelihood of whether the packet flows indicate a likelihood of intrusion detection and/or lack thereof—such detection which can lead to classification of the flow as suspect or not suspect.

Data extractor 108 may extract based on data patterns. These patterns enable extractor 108 to mine arbitrary information and extract certain, selected information, from the data which is received and reviewed.

Data attribute updater 110 preferably is configured to add custom properties to data. Such custom properties may include data extracted from primary and secondary data sources to add/remove/edit clarity, value, security or other data attributes. Another example could include adding data markers as each packet, or other segment, of data is inspected. Another example may include adding one or additional layers of tokenization. The additional layers of tokenization may depend on the sensitivity of the data passing through the architecture as well as the availability of custom fields required for certain documents and/or certain classes of documents.

Data query selector 112 provides a layer wherein strong inspection and review processing takes place. Such inspection and review processing may include, for example, validating data extracted via extractor 108 and validating such data against certain policies to meet regulatory, or other relevant, needs.

Data visualizer 114 may be a layer that provides full business infographics, as necessary, to express the static and dynamic results obtained from the ongoing analysis and review ("A & R").

Data auditor 116 may preferably audit data. In addition, data auditor 116 may provide a supervisory layer for continuously, or periodically, monitoring traced data. Data auditor 116 may preferably output the data as inspected data 118.

Figure 2A:
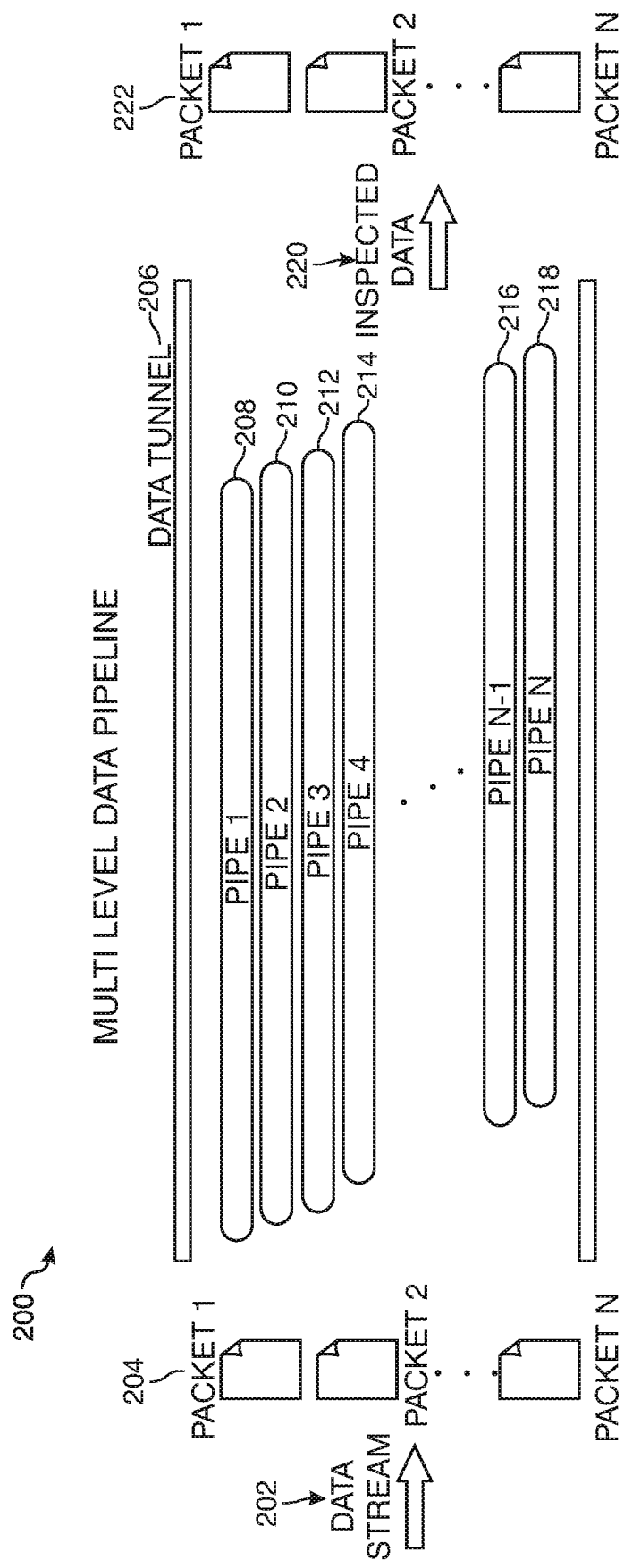
FIG. 2A shows another illustrative network architecture including a multi-level data pipeline in accordance with principles of the disclosure.

FIG. 2A shows a multi-level data pipeline 200. Multi-level data pipeline 200 preferably includes an incoming data stream 202. Data stream 202 is preferably a candidate for A & R.

Each of pipes 208-218 preferably may include one, some or all of mechanisms 102-114 shown in FIG. 1. In such a pipeline, the coordination of movement of data from one pipe to the next may also require an additional, overseeing data pipeline manager (not shown) that coordinates passage of the data into, between and out of one or more of the pipes 208-218.

Figure 2B:
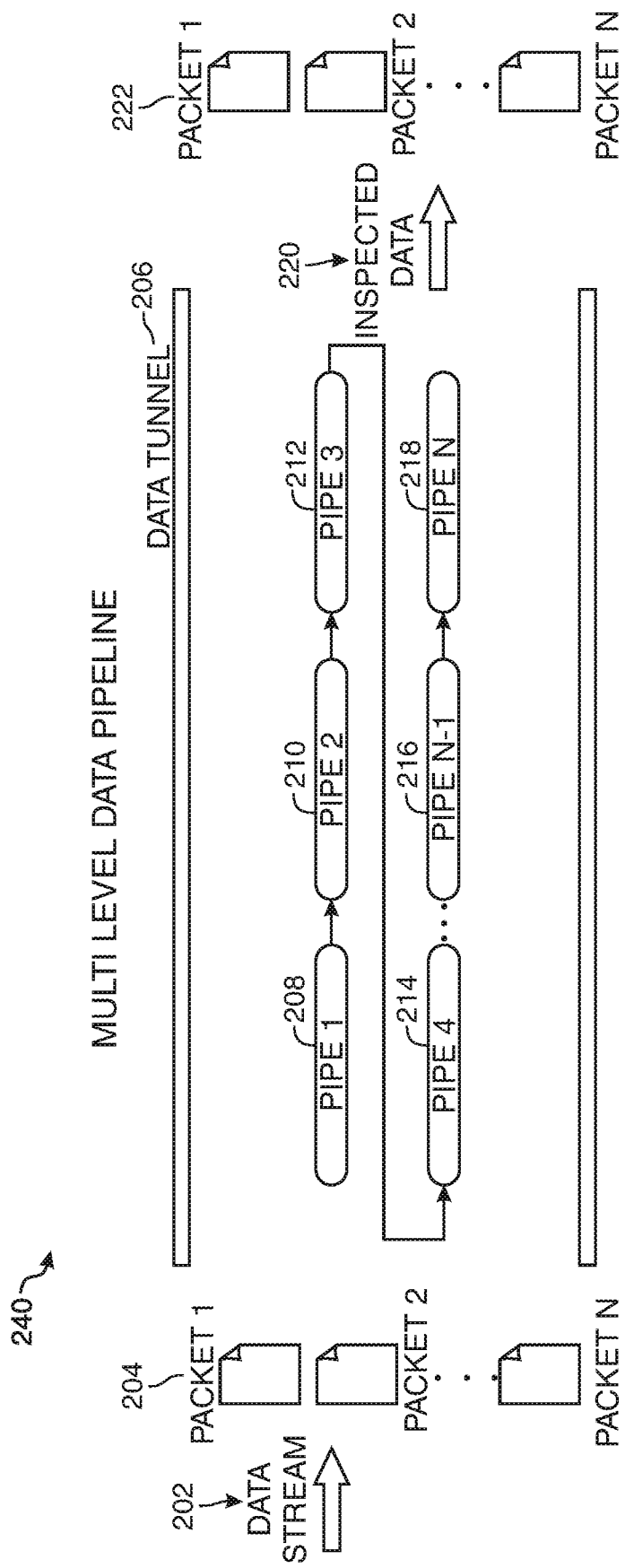
FIG. 2B shows yet another illustrative network architecture including a multi-level data pipeline, with various pipes disposed in a serial connection in accordance with principles of the disclosure.

It should be noted that the arrangement of pipes 208-218 may be in one of a number of various arrangements. For example, the pipes may be laid out in a serial arrangement—i.e., the output of a first pipe may provide the input for a next pipe and so on. FIG. 2B shows the pipes laid out in serial arrangement 240.

Figure 2C:
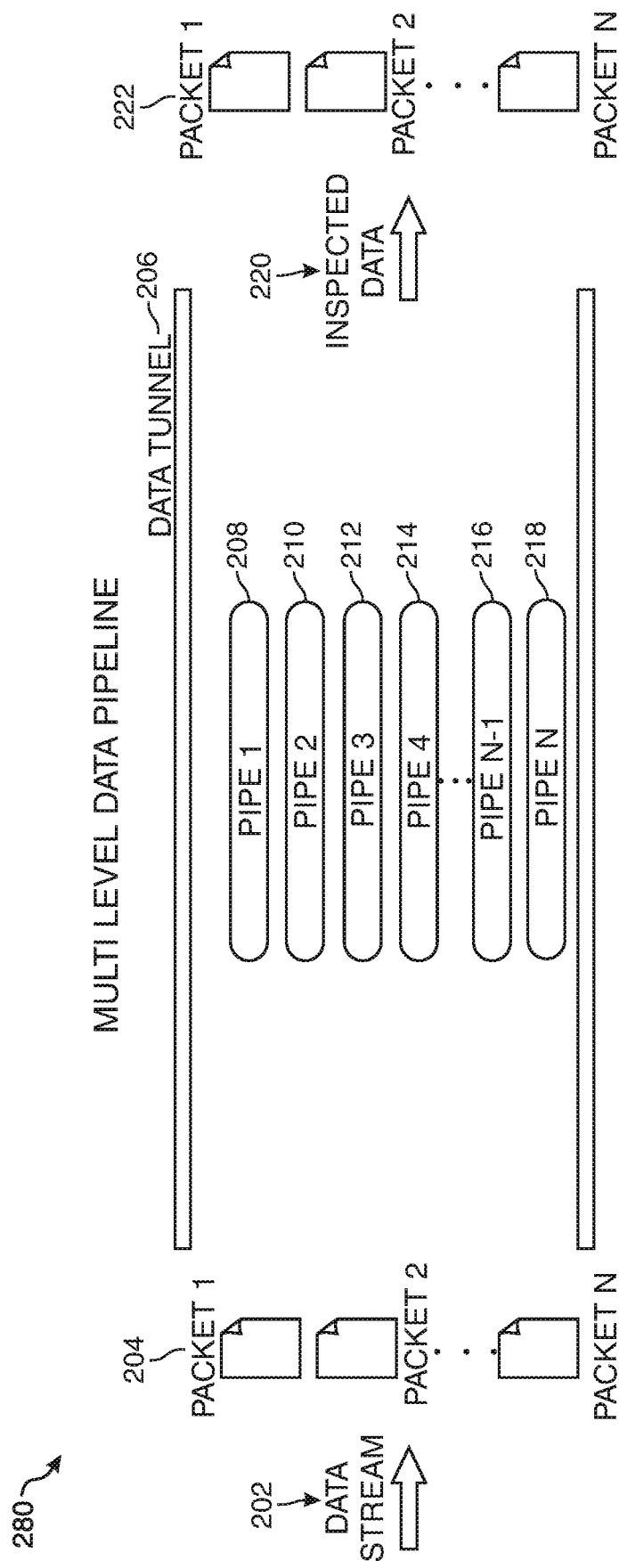
FIG. 2C shows yet another illustrative network architecture including a multi-level data pipeline, with various pipes disposed in a parallel fashion in accordance with principles of the disclosure.

In another arrangement, pipes may be laid out in a parallel arrangement—i.e., all (or some) of the pipes may have inputs that receive different streams and outputs that output different streams. FIG. 2C shows this network architecture. This network architecture, which includes a multi-level data pipeline, shows the various pipes disposed in a parallel fashion 280 in accordance with principles of the disclosure. It should be noted that the decision as to which data goes into which pipe may be handled by, for example, a data pipeline manager (not shown in FIGS. 2A-2C). Such a data pipeline manager may preferably determine based on a suitable algorithm the target address for transmission of the data packets. This target address may depend on, for example, packet size, packet security, and/or any other suitable factor.

In some parallel embodiments, multi-pipe, or multi-tier, data diverters may be implemented. These diverters may serve to reduce bandwidth consumption relating to in-line data review. Each pipe, or tier, may correspond to a security level associated with data packets found in a data stream. For example, a top-level pipe, or tier, may be reserved for reviewing a data stream including data packets that include, or reference, a social security number. A second exemplary pipe or tier may be reserved for reviewing a data stream including data packets that include, or reference, an account number. The security-based arrangement of pipes may also be utilized in accordance with certain embodiments of the serial-based arrangement of the pipes.

In some embodiments, each pipe, or tier, may correspond to a size-dimension associated with data packets found in a data stream. For example, a top-level pipe, or tier, may be reserved for reviewing a data stream including data packets that less than a pre-determined size threshold. In such a pipe or tier, the speed can remain relatively high because the packets are small and can be inspected relatively quickly. A second exemplary pipe or tier may be reserved for reviewing a data stream including data packets that are greater in size than the first threshold but less than a second threshold, etc. The security-based arrangement of pipes may also be utilized in accordance with certain embodiments of the serial-based arrangement of the pipes.

Figure 2D:
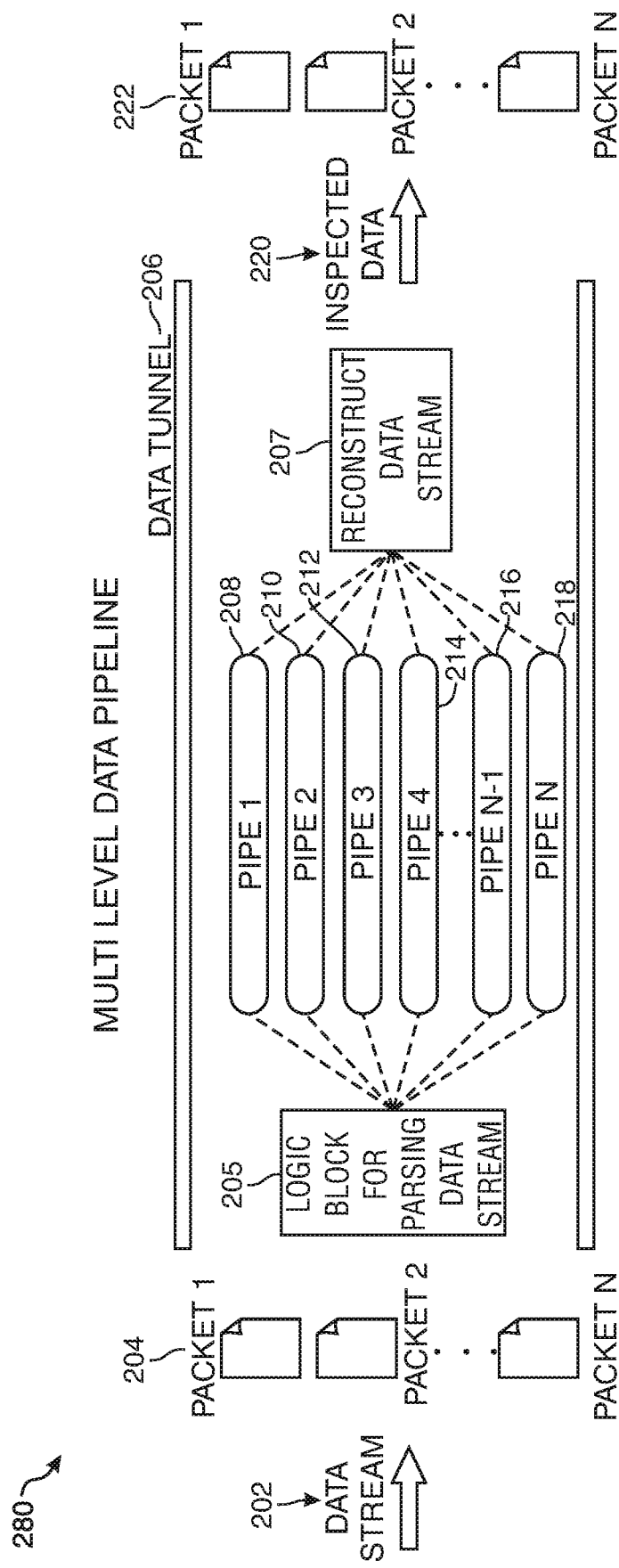
FIG. 2D shows still another illustrative network architecture including a multi-level data pipeline, the pipeline including various pipes disposed in a parallel fashion and the pipeline further including front end and back end logic blocks, in accordance with principles of the disclosure.

FIG. 2D shows still another illustrative network architecture include a multi-level data pipeline, with various pipes disposed in a parallel fashion, having a front end logic block(s) 205 and/or a back end logic block(s), in accordance with principles of the disclosure.

Logic block 205 preferably serves to parse data stream 202. As described above, logic block may divide data stream into various streams, each including a portion of the data stream 202. Each of such portions may include a portion of the total data stream.

Figure 2E:
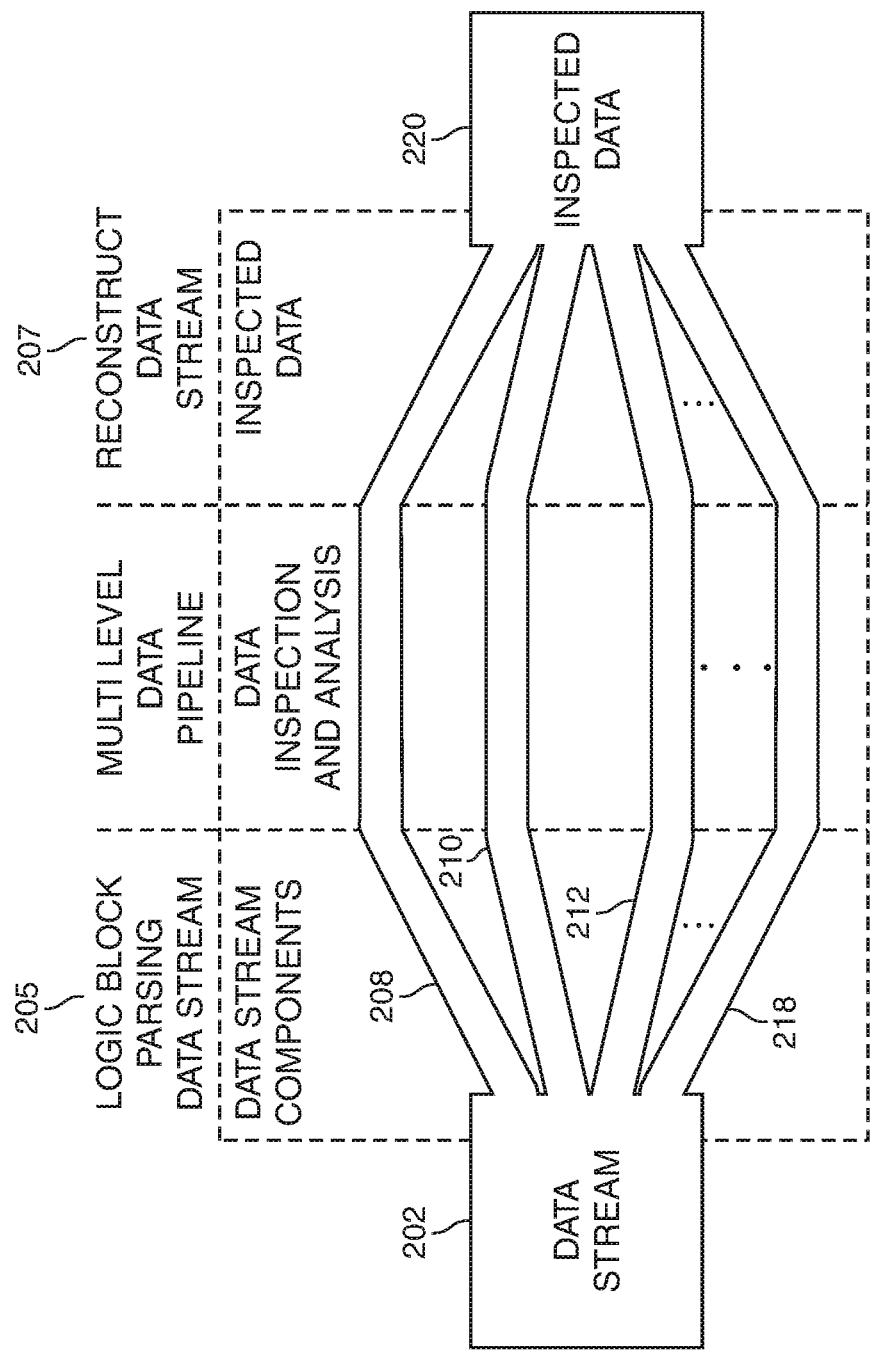
FIG. 2E shows an illustrative network architecture including a multi-level data pipeline, with various pipes disposed in a parallel fashion, the pipeline including front end and back end logic blocks for parsing a data stream and reconstructing same, in accordance with principles of the disclosure.

FIG. 2E shows, schematically, logic block 205 parsing data stream 202 into pre-determined packets. Each of the packets, depending upon its characterization, may be transferred through one of pipes 208, 210, 212, 214, 216 and 218. Such parsing may include dividing data stream 202 based on the size of packets. As such—all packets having a first packet size, or within a first packet size window, may preferably be transmitted through pipe 208; all packets having a second packet size, or within a second packet size window, may preferably be transmitted through pipe 210, etc.

It should be noted that the relative speed of transmission of each of the pipes should preferably depend, to some extent if not completely, on the size of the packets.

In other embodiments, such parsing may include dividing data stream 202 based on the contents of packets. For example—all packets having a high-security payload, such as a social security number, may preferably be transmitted through pipe 208; all packets having a second security level payload, such as an account number, may preferably be transmitted through pipe 210.

In some embodiments, there may be multiple data pipeline managers that are disposed throughout various pipes 208-218. For example, one data pipeline manager may be assigned to coordinate the movement between pipes 208-212 while another may be assigned to coordinate the movement between pipes 214-218. Alternatively, there may be more data pipeline managers, as needed for the system.

The data stream 202, formed from packets 1 to N at 204, preferably exits as inspected data 220, formed from inspected packets 1 to N at 222.

As described above, data packets (DP1, DP2, ... DPn) may form a data stream 202. Data stream 202—may be parsed into components. The parsing may break down each data stream 202 into component streams of different packet size.

For example a data stream : DS may be broken down into component data streams $DS_1, DS_2, DS_3 \ldots DS_n$. The data streams $DS_1, DS_2, DS_3 \ldots DS_n$ may each correspond to a different packet size. $DS_1, DS_2, DS_3 \ldots DS_n$ may correspond to packet size ("PS") $PS_1, PS_2, PS_3 \ldots PS_n$.

Further, each PS may preferably be routed to a unique data pipe. As described above, data pipes ($L_1, L_2, L_3 \ldots L_n$) may each correspond to a specific packet size one of $PS_1$, $PS_2, PS_3 \ldots PS_n$. As such, the size and characteristics each of the data pipe may be customized. The data pipe may be customized based on the type of data packet, and, consequently, the characterization of the partial data stream, that it carries.

Figure 2F:
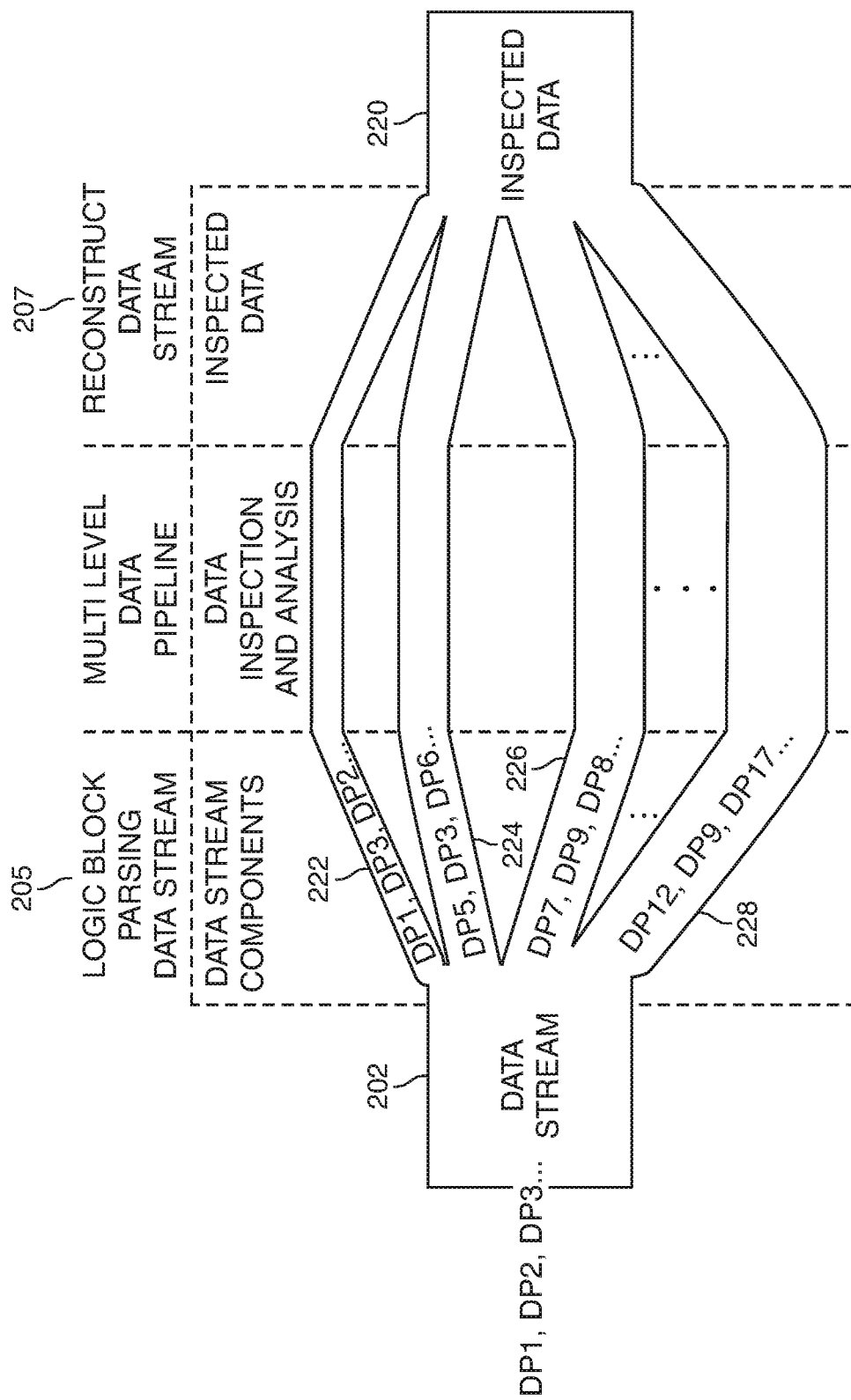
FIG. 2F shows still another illustrative network architecture including a multi-level data pipeline, with various pipes disposed in a parallel fashion, each pipe configured to transfer a different packet size, in accordance with principles of the disclosure.

As shown in FIG. 2F, each of data pipes 221, 224, 226 and 228 may preferably be configured to carry different packet sizes. Moreover, each of data pipes 221-228 may be configured to have different processing capacities, as signified by the different relative sizes of data pipes 221, 224, 226 and 228 shown in FIG. 2F. Accordingly, each of data pipes 221-228 may be of different actual sizes.

Figure 2G:
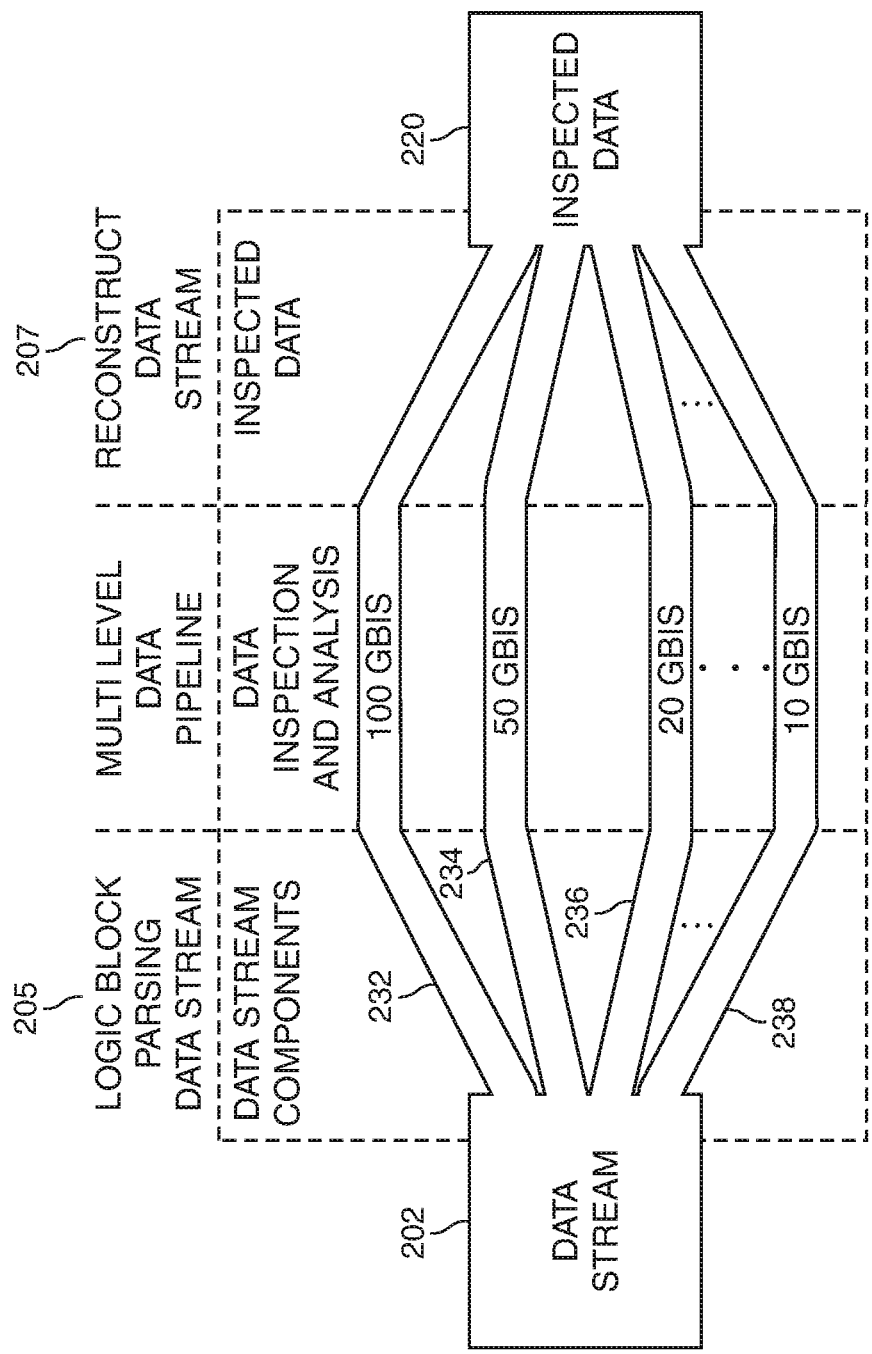
FIG. 2G shows still another illustrative network architecture including a multi-level data pipeline, with various pipes disposed in a parallel fashion, each pipe having a unique data transfer rate, in accordance with principles of the disclosure.

In addition, the speed of processing of each of the data pipes may be different. As shown in FIG. 2G, each of data pipes 232, 234, 236 and 238 may preferably transfer information at different transmission speeds. In some embodiments, the smaller packets may be identified by logic block 205, analyzed and reviewed, and then transmitted at a faster rate, while larger packets may be identified, analyzed and reviewed, and then transmitted at a slower rate. Exemplary rates of 100 gigabytes ("GB")/second, 50 GB/second etc. are shown in FIG. 2G but any suitable rates may be used in the embodiments. It should be noted that in certain embodiments, all of the pipes may preferably transmit information at a similar rate.

Figure 3A:
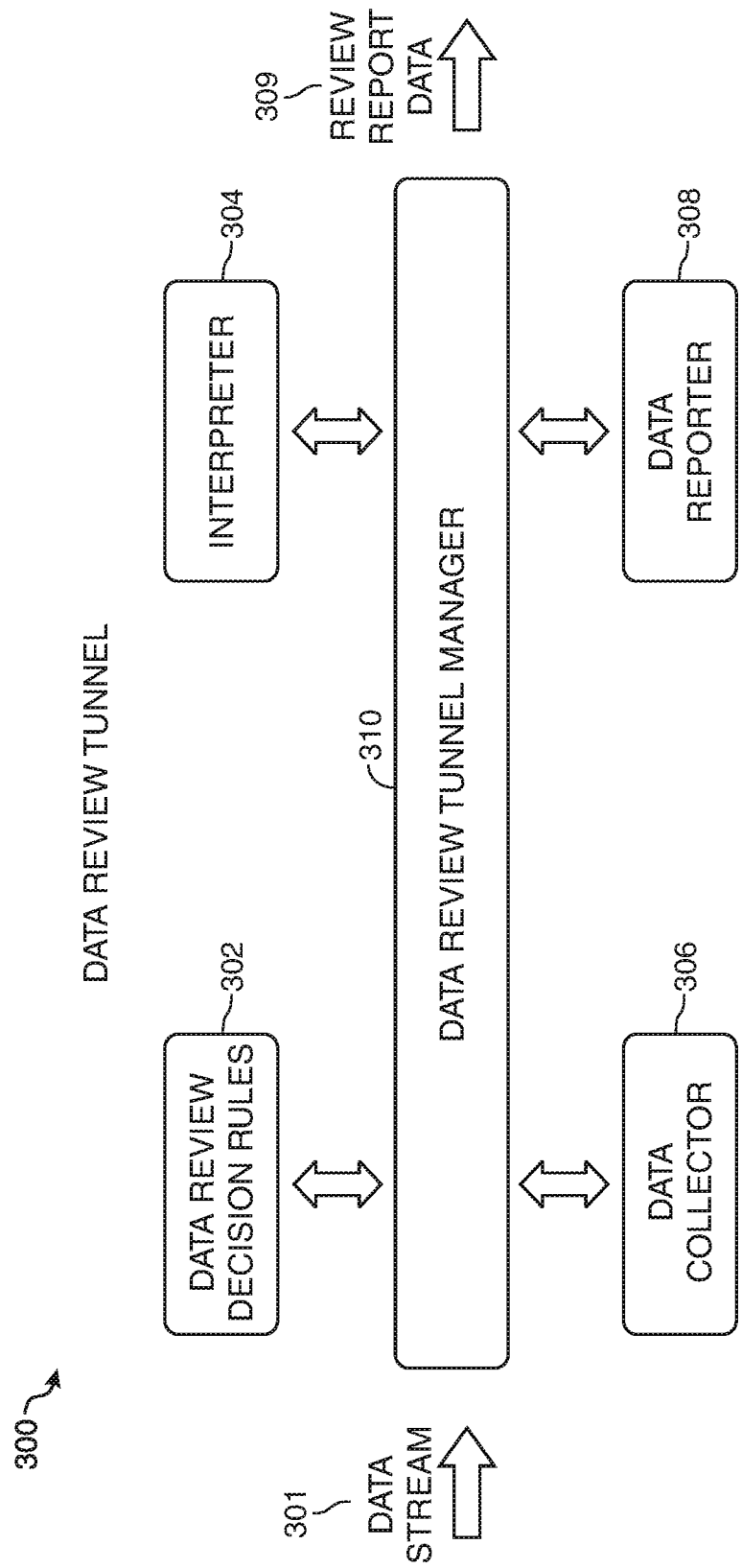
FIG. 3A shows an illustrative system architecture including a data review tunnel in accordance with principles of the disclosure.

FIG. 3A shows a schematic diagram of an exemplary data review tunnel 300 according to certain embodiments. Data review tunnel 300 preferably includes, and communicates with, data review decision rules module 302, data interpreter module 304, data collector module 306 and/or data reporter module 308. The entirety of the data review, and data movement, and records movement, attendant thereto, is preferably coordinated by data review tunnel manager 310.

The data review decision rules module 302 preferably includes rules for reviewing and analyzing the data. Data review tunnel manager 310 preferably communicates with data review decision rules module 302 to determine the meets and bounds of the analysis and review of data that will take place.

Data collector module 306 preferably is configured to receive, review and analyze data received by data review tunnel manager 310.

Data interpreter module 304 is preferably configured to review data received by data review tunnel manager 310 and to establish the type of data for reference by data review tunnel manager 310. Data reporter module 308 may be configured to prepare a report based on the analysis and review conducted by data review tunnel manager 310 in conjunction with data review decision rules module 302, data interpreter module 304 and data collector module 306.

In certain embodiments, it should be noted that the four "spokes" 302-308 that extend from data review tunnel manager 310, together with data review tunnel manager 310, may form a multiplexer such that any packets that enter spokes 302-308 may require an acceptance by all of spokes 302-308 prior to exiting data review tunnel manager 310. As such, tunnel 300 preferably acts as an AND logic gate which validates, and allows to pass, data packets only after full review and validation at the four different spokes 302-308.

Figure 3B:
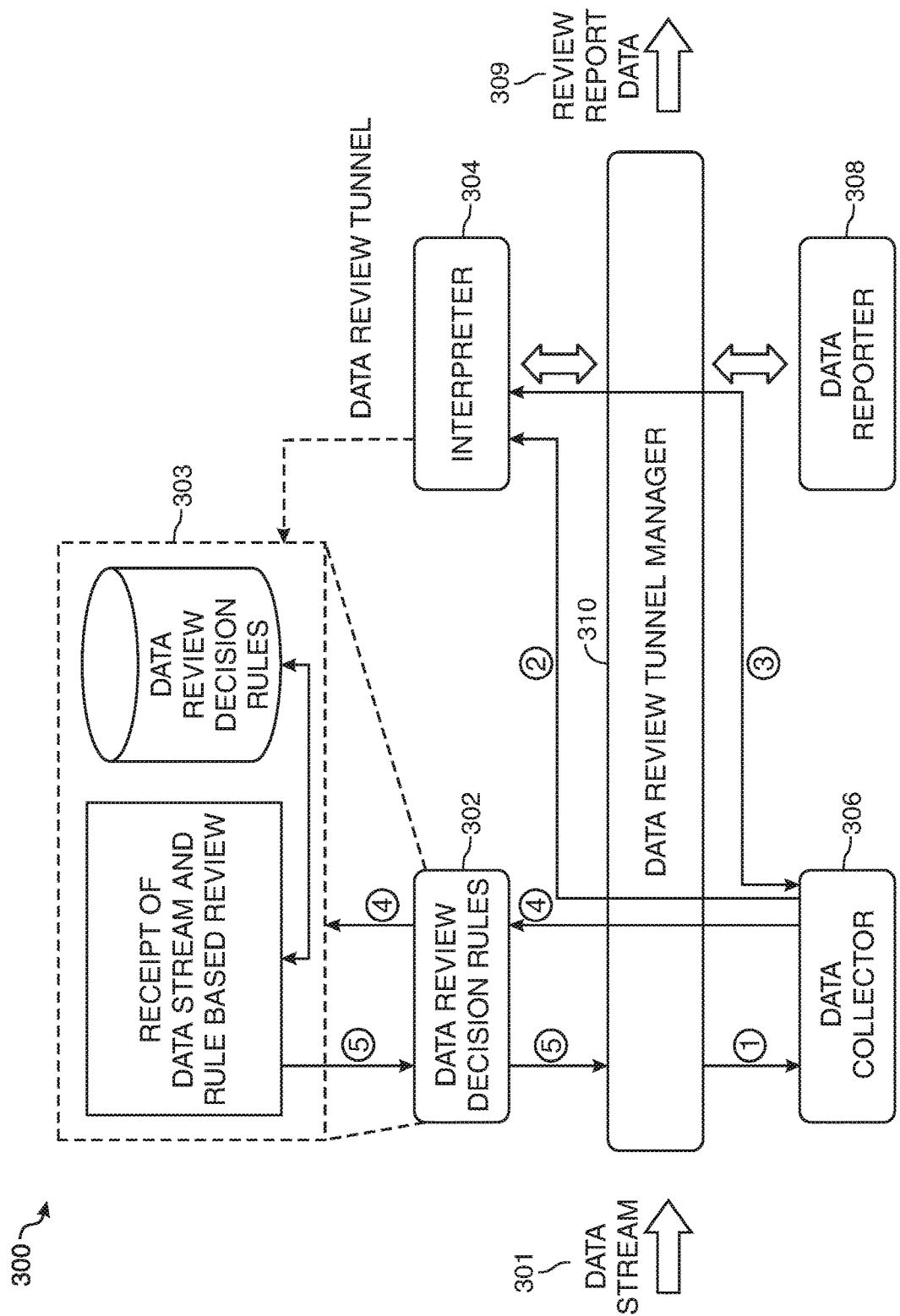
FIG. 3B shows another aspect of the data review tunnel from FIG. 3A in accordance with principles of the disclosure.

FIG. 3B shows another aspect of the data review tunnel from FIG. 3A in accordance with principles of the disclosure. FIG. 3B illustrates initial steps of a method according to certain embodiments. At (1), data review tunnel manager 310 may deflect—i.e., push—data stream 301 to data collector 306 (or, alternatively, data collector 306 may pull incoming data from data review tunnel manager 310).

In order to appropriately parse the incoming data, data collector 306 may transfer data to interpreter 304, as shown at (2). Following interpretation at interpreter 304, interpreted data may be returned to data collector at (3). Thereafter, at (4), the interpreted data may be transferred for review with respect to the data review decision rules, at 303. In other embodiments, it is foreseen (shown in solid line and, in the alternative, in hashed line in FIG. 3C) that interpreter 304 may transfer the interpreted data directly to data review decision rules 302 for review in view of data review decision rules 302/303.

In either case, data review decision rules 302, at (5), may transfer interpreted data back to data review tunnel manager 310.

Figure 3C:
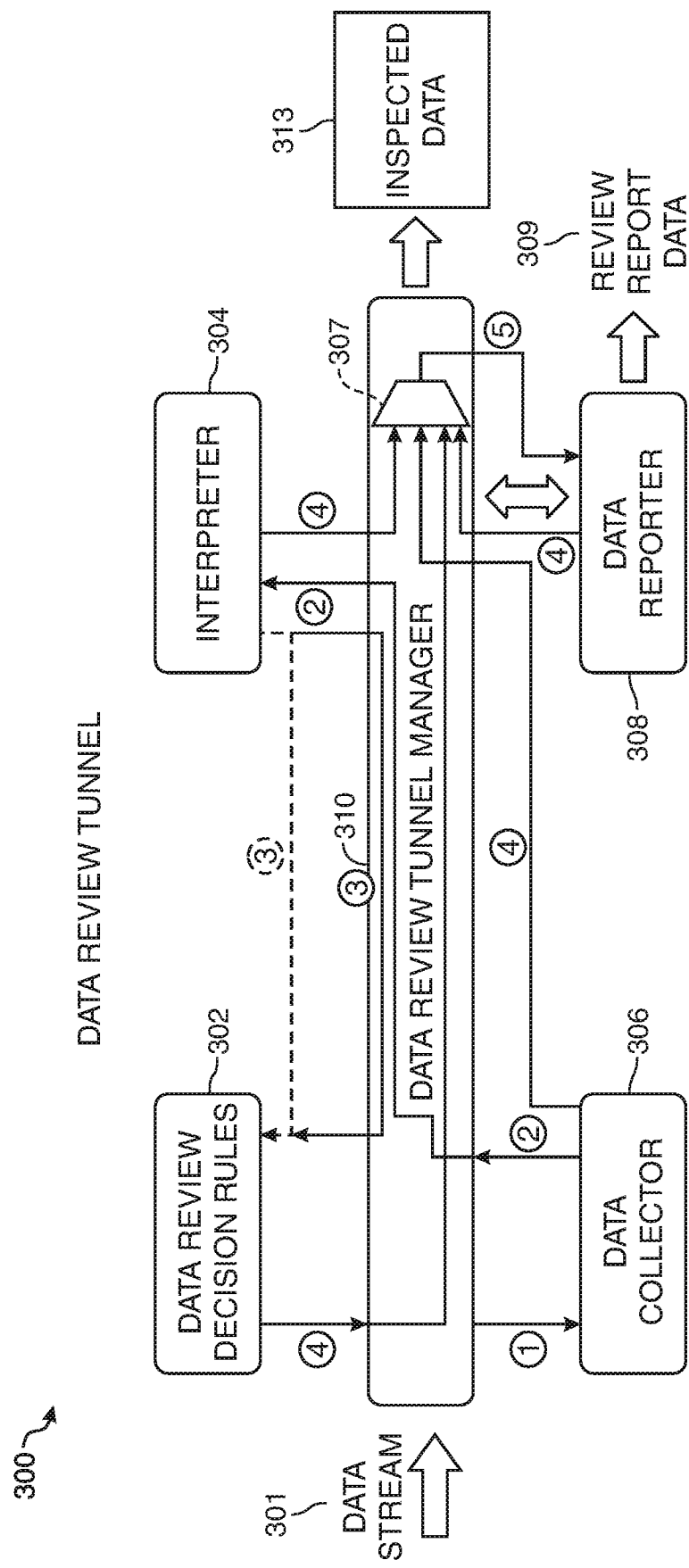
FIG. 3C shows yet another aspect of the data review tunnel from FIG. 3A in accordance with principles of the disclosure.

FIG. 3C shows yet another aspect of the data review tunnel from FIG. 3A in accordance with principles of the disclosure. In FIG. 3C, data review tunnel manager 310 is shown as multiplexing, at (4), data-based responses from interpreter 304, data review decision rules 302, data collector 306 and data reporter 308 to formulate a unified output. The unified output may output a data validation signal (or an invalid data signal) (not shown), inspected data 313 and/or a data report 309. Data reporter 308 may actually be the module that generates the report, but the report only gets transmitted via data review tunnel manager 310. In such an architecture, data review tunnel manager 310 may perform as a hub for the various spokes that project therefrom. In certain embodiments, the data may be validated, and/or a data report may be produced by data review tunnel manager 310 only if all of the components—i.e., data collector 306, data review decision rules 302, interpreter 304 and data reporter information 305—signal data review tunnel manager 310 to validate the data and/or produce the report.

Figure 3D:
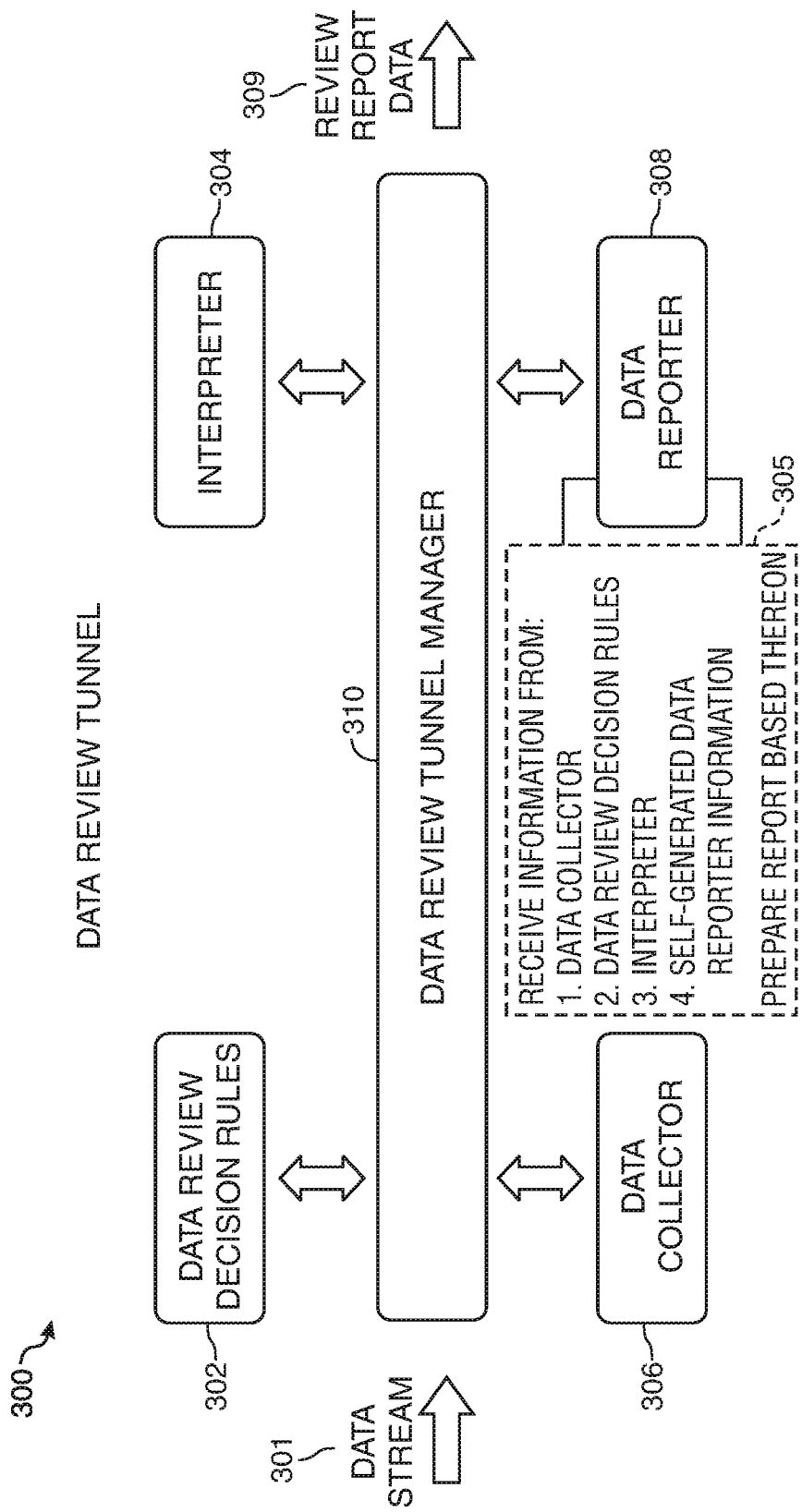
FIG. 3D shows still another aspect of the data review tunnel from FIG. 3A in accordance with principles of the disclosure.

FIG. 3D shows still another aspect of the data review tunnel from FIG. 3A in accordance with principles of the disclosure. Specifically FIG. 3D illustrates information 305 regarding operation of data reporter 308. In some embodiments, data reporter 308 may operate as follows. It may receive, via data review tunnel manager 310, information from data collector 306, data review decision rules 302, interpreter 304 and may even produce some of its own self-generated data reporter information, as shown in 305.

Figure 4:
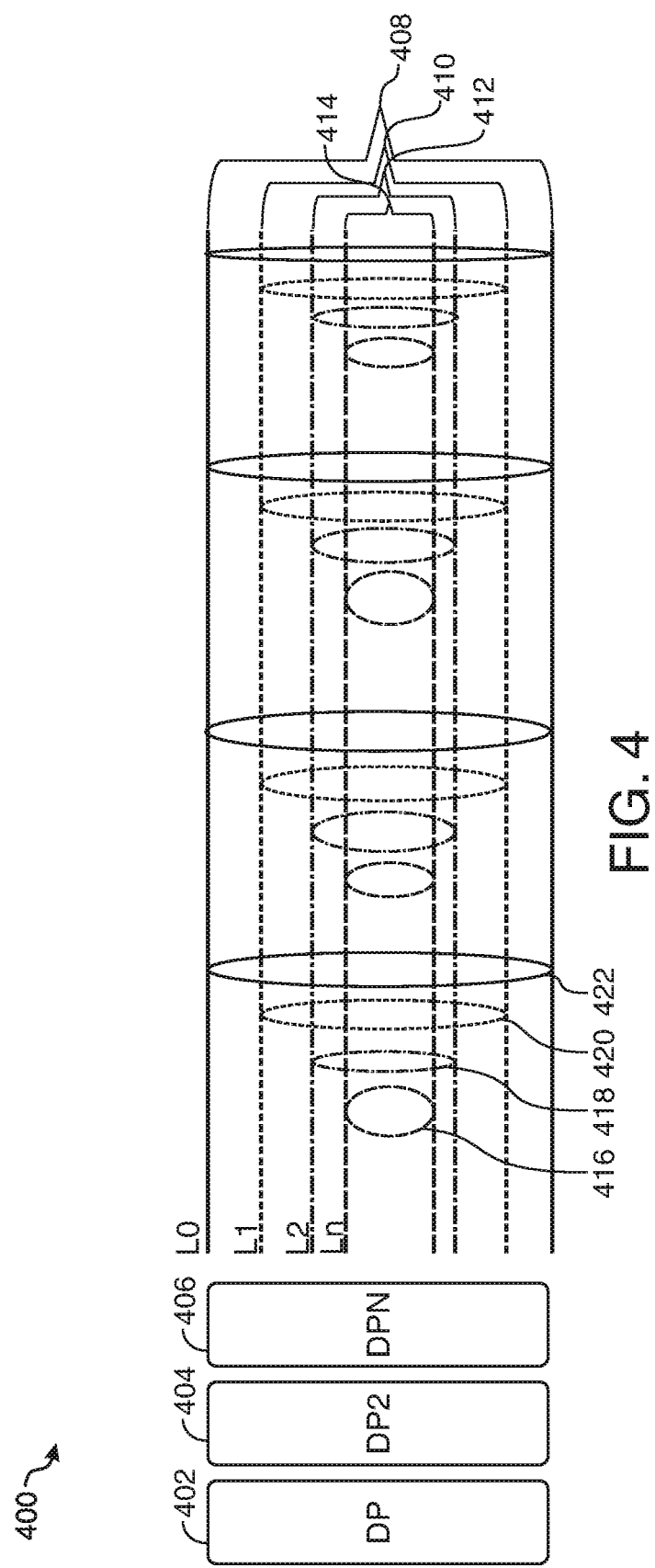
FIG. 4 shows yet another illustrative network architecture in accordance with principles of the disclosure.

FIG. 4 shows a schematic diagram of an exemplary arrangement 400 of data review tunnels 416-422 as they intersect with a plurality of complementary pipe (or alternatively, "data conduits") pairs 408-412. Data packets 402-406 are shown to the left as entering and traveling through pipe pairs 408-412.

Pipe pairs 408-412 are shown as complementary pairs as opposed to single data pipes. The complementary pairs enable the arrangement 400 to process large amounts of real-time or streaming data.

In certain embodiments, the complementary pairs of pipes 408-412 may illustrate schematic descriptions of double-key systems. For example, when a first entity wants to contact a second entity using electronic communication, the first entity may encrypt the transmission using a first encryption key. On the receiving end, the second entity, may decode the transmission using the key with which the first entity encoded the information. However, if a malicious actor breaks the encryption key, then the communication is in danger of a security breach.

In order to increase security, the transmitter of information may transmit information over two pipes instead of one. In order to hack such a transmission, a malicious actor will be required to hack both information pipes in order to reconstruct the transmission. If an even greater level of security is desired, then the two-pipe solution can implement two security keys. For example, if the transmitter uses a public key provided by the recipient to encrypt the transmission and then further encrypts the transmission using a the transmitter's own private key, then the recipient will be required to decode the transmission using both the public key and the private key. The security of the transmission will be further heightened by using dual (or more) transmission pipes to transmit the transmission.

Tunnels 416-422 may be configured as data review tunnels 300 set forth in FIG. 3. Tunnels 416-422 are shown as intersecting both complementary pipes of each of pairs 408-412. In such an architecture, tunnels 416-422 can provide the data channeling sufficient for implementing the processing, et al., shown in FIG. 3. Tunnels 416-422 preferably stretch across both pipes because the information in both pipes is preferably critical to performing analysis and review of the information in both pipes.

The data channeling described herein in the portion of the specification corresponding to FIGS. 1-4 may support real-time or near real-time data inspection and review. Furthermore, the data channeling may enable efficient control and data attribute/metadata extraction to compare against data records stored in a System of Record/Registration ("SOR") and/or Authorized Data Source ("ADS").

Preferably all of the embodiments shown herein allow for certain data stripping capabilities based on SOR and/or ADS including the ability to compare and/or correct inconsistent data—i.e., data that does not conform to the SOR and/or the ADS.

Moreover, the systems and architectures described herein preferably provide the ability to dynamically freeze one or more data channels with respect to one or more data packets/streams. Freezing a data channel may be required in a data breach situation or other emergency situation. In addition, the systems and architectures described herein preferably allow certain data to pass based on a pending registration/attribute review, or put in a holding pattern and/or holding zone pending the exit of frozen data currently stuck in the channel.

In certain embodiments of the architectures shown in FIG. 1-4, the pipes could have different set of requirements that can be implemented as part of an initial application but also support real-time adjustment based on real/perceived threats or any other selected stimuli.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for multi-spoke data tunnel inspection architectures are provided. Persons skilled in the art will appreciate that the present invention can be practiced by other than the described embodiments, which are presented for purposes of illustration rather than of limitation, and that the present invention is limited only by the claims that follow.

What is claimed is:

1. A multi-spoke data tunnel inspection architecture, the architecture comprising:
   a data tunnel, the data tunnel in electronic communication with a complementary pair of a first data conduit and a second data conduit, the data tunnel comprising:
   a data review tunnel;
   a data collector in electronic communication with the data review tunnel;
   an interpreter in electronic communication with the data review tunnel;
   a set of data review decision rules in electronic communication with the data review tunnel;
   a data reporter in electronic communication with the data review tunnel;
   wherein the data review tunnel is configured to:
   receive a first portion of a data stream in the first data conduit, said first portion of the data stream encrypted with a first encryption scheme;
   receive a second portion of the data stream in the second data conduit, said second portion of the data stream encrypted with a second encryption scheme;
   decrypt and reconstruct a complete data stream, said complete data stream formed from the first data stream and the second data stream;
   analyze and review the flow of the data stream in conjunction with the data collector, the interpreter, and the set of data review decision rules, said analyzing and reviewing for determining whether the flow of the data stream is associated with a higher than threshold level of likelihood of intrusion; and
   prepare, using the data reporter, a data report based on the analysis and review, and use the data reporter to publish the data report.

2. The architecture of claim 1, wherein the data collector is configured to coordinate transportation of data from ingestion at data receipt, and throughout the rest of the multi-spoke data inspection tunnel architecture.

3. The architecture of claim 1, wherein the interpreter is configured to review data received by the data review tunnel and to establish a type of data for reference by the data review tunnel.

4. The architecture of claim 1, wherein the set of data review decision rules is configured to store rules for reviewing and analyzing the data.

5. The architecture of claim 1, wherein the data review tunnel is in electronic communication with a second complementary pair of data conduits, the second complementary pair of data conduits operable to review and analyze data at a different security level from the first complementary pair of data conduits.

6. The architecture of claim 1, wherein the data review tunnel is only configured to validate data in the data stream based on a validation of the data in the data stream received from each of the data collector, the interpreter, and the set of data review decision rules.

7. The architecture of claim 6, wherein the data reporter is configured to only prepare a report based on the validation of the data stream by the data review tunnel.

8. A multi-level data channel and inspection architecture, said architecture comprising:
- a multi-level data pipeline, said pipeline receiving a data stream at an upstream portion of the tunnel and outputting inspected data at a downstream portion of the pipeline, wherein said pipeline comprises:
  - a plurality of pipes, said plurality of pipes comprising one or more complementary pairs of pipes, each pipe within a complementary pair of pipes encrypted using a different security key from the security key used to encrypt a second pipe of the same complementary pair of pipes, wherein encryption of the data stream as it passes through the two pipes in each of the complementary pair of pipes forms a two-key encryption scheme;
  - a data manager is configured to coordinate passage of the data into and out of the pipeline; and
  - wherein each of the complementary pairs of pipes is configured to inspect the data on a different level of data channel inspection than any of the other of the complementary pair of pipes, each level of data channel inspection having individual data attribute and/or metadata extracting capabilities.

9. The architecture of claim 8, wherein each of the complementary pairs of pipes are coupled in parallel to one another within the multi-level data pipeline.

10. The architecture of claim 8, wherein each complementary pair of pipes is configured to review and analyze a flow of data through the complementary pair of pipes, said review and analysis of the flow being based on flow characteristics of the data stream.

11. The architecture of claim 8, wherein each of the complementary pair of pipes is configured to carry a partial amount of the data stream.

12. The architecture of claim 8, wherein each complementary pair of pipes is in electronic communication with a second complementary pair of data pipes, the second complementary pair of data pipes operable to review and analyze data at a different security level from the first complementary pair of data pipes.

13. A method for providing deep packet inspection of data in a multi-spoke data tunnel inspection architecture, the method comprising:
- using a data review tunnel module to receive, in a data tunnel, a first portion of a data stream in a first data conduit, said first portion of the data stream encrypted with a first encryption scheme;
- using the data review tunnel module to receive a second portion of the data stream in the second data conduit, said second portion of the data stream encrypted with a second encryption scheme;
- decrypting and reconstructing a complete data stream, said complete data stream derived from the decrypted and reconstructed first data stream and the decrypted and reconstructed second data stream;
- analyzing and reviewing the flow of the complete data stream in conjunction with a data collector module, an interpreter module, and a set of data review decision rules module, said analyzing and reviewing for determining whether the flow of the data stream is associated with a higher than threshold level of likelihood of intrusion; and
- preparing, using a data reporter module, a data report based on the analysis and review, and use the data reporter module to publish the data report.

14. The method of claim 13, wherein the data collector module is configured to coordinate transportation of data from ingestion at data receipt, and throughout the rest of the multi-spoke data inspection tunnel architecture.

15. The method of claim 13, wherein the interpreter module is configured to review data received by the data review tunnel module and to establish a type of data for reference by the data review tunnel module.

16. The method of claim 13, wherein the set of data review decision rules module is configured to store rules for reviewing and analyzing the data.

17. The method of claim 13, wherein the data tunnel is in electronic communication with a second complementary pair of data conduits, the second complementary pair of data conduits operable to review and analyze data at a different security level from the first complementary pair of data conduits.

18. The method of claim 13, wherein the data review tunnel module is only configured to validate data in the data stream based on a validation of the data in the data stream received from each of the data collector module, the interpreter module, and the set of data review decision rules module.

19. The method of claim 13, wherein the data reporter module is configured to only prepare a report based on the validation of the data stream by the data review tunnel module.

* * * * *